US012791879B2

(12) United States Patent
Lagasi et al.

(10) Patent No.: US 12,791,879 B2
(45) Date of Patent: Nov. 10, 2026

(54) OPHTHALMIC ARTICLES

(71) Applicant: Barberini S.p.A., Silvi (IT)

(72) Inventors: Matteo Lagasi, Silvi (IT); Natalia Schianchi, Silvi (IT)

(73) Assignee: Barberini S.p.A., Silvi (IT)

( * ) Notice: Subject to any disclaimer, the term of this patent is extended or adjusted under 35 U.S.C. 154(b) by 319 days.

(21) Appl. No.: 18/683,182

(22) PCT Filed: Aug. 1, 2022

(86) PCT No.: PCT/EP2022/071561
§ 371 (c)(1),
(2) Date: Feb. 12, 2024

(87) PCT Pub. No.: WO2023/016842
PCT Pub. Date: Feb. 16, 2023

(65) Prior Publication Data

US 2024/0369857 A1 Nov. 7, 2024

(30) Foreign Application Priority Data

Aug. 13, 2021 (EP) .................................... 21191222

(51) Int. Cl.
*G02C 7/10* (2006.01)

(52) U.S. Cl.
CPC .................................... *G02C 7/108* (2013.01)

(58) Field of Classification Search
CPC ........ G02C 7/102; G02C 7/104; G02C 7/101; G02C 7/10; G02C 7/12; G02B 5/22; G02B 5/23; G02B 5/223; C09K 9/02
See application file for complete search history.

(56) References Cited

U.S. PATENT DOCUMENTS

2001/0050356 A1 12/2001 Crano et al.
2010/0232003 A1* 9/2010 Baldy ...................... G02C 7/12 359/243

(Continued)

FOREIGN PATENT DOCUMENTS

CA 2890882 A1 2/2016
CN 111108430 A 5/2020
DE 10026717 A1 12/2001

(Continued)

OTHER PUBLICATIONS

European Communication pursuant to Article 94(3) EPC dated Nov. 17, 2025 in corresponding European Application No. 22757598.2, 6 pages.

(Continued)

*Primary Examiner* — Ephrem Z Mebrahtu
(74) *Attorney, Agent, or Firm* — MH2 Technology Law Group LLP

(57) ABSTRACT

An ophthalmic article may include a polymer substrate. The polymer substrate may include at least one area with a blend of contrast-enhancing dyes and photochromic dyes. The ophthalmic article may present, at least in the at least one area with the blend of contrast-enhancing dyes and photochromic dyes, a contrast level value of $K_{up} \geq 20$ in an activated state of the photochromic dyes, which is higher than the contrast level value in a deactivated state of the photochromic dyes.

20 Claims, 10 Drawing Sheets

(56) References Cited

U.S. PATENT DOCUMENTS

Figure 1:
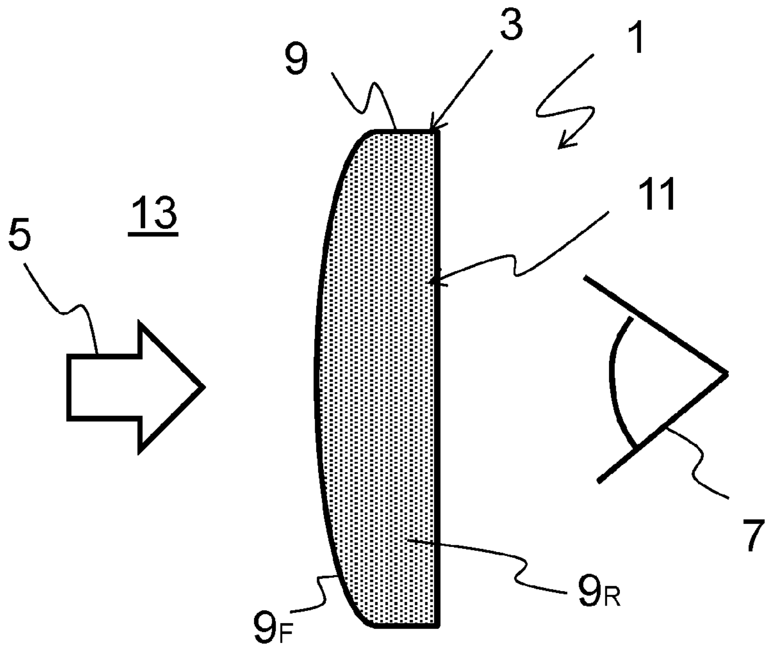
Figure 2:
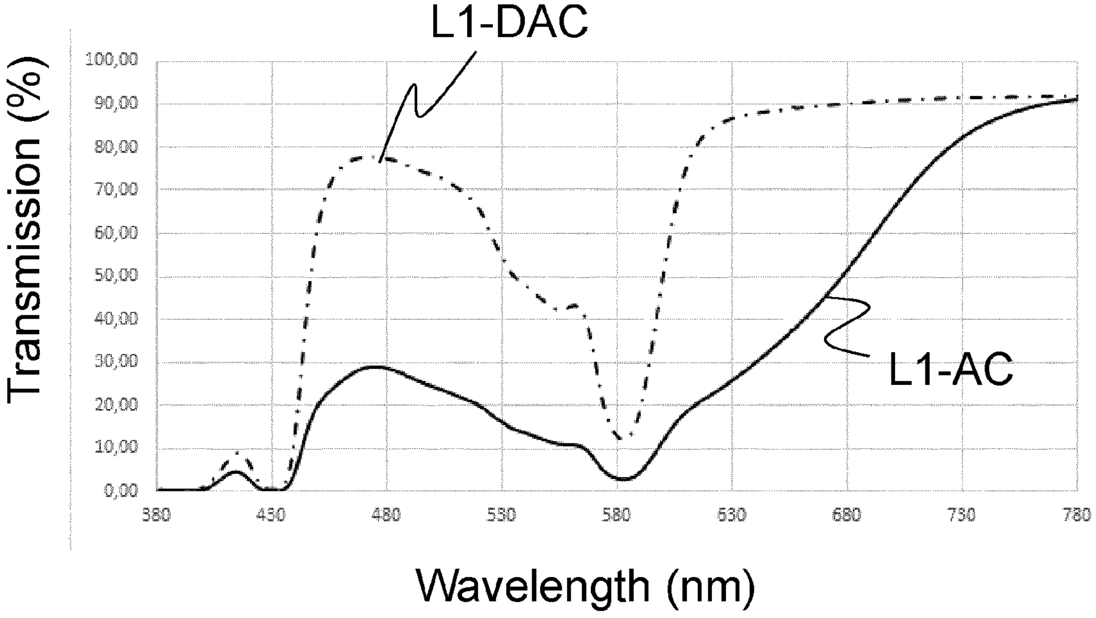
Figure 3:
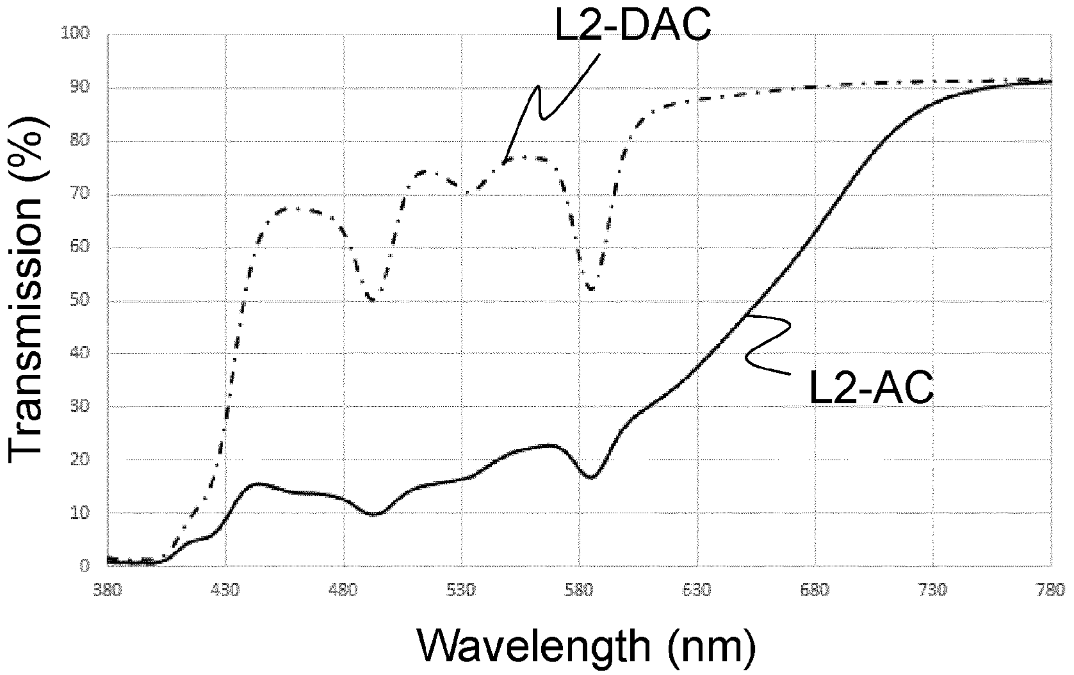
Figure 4:
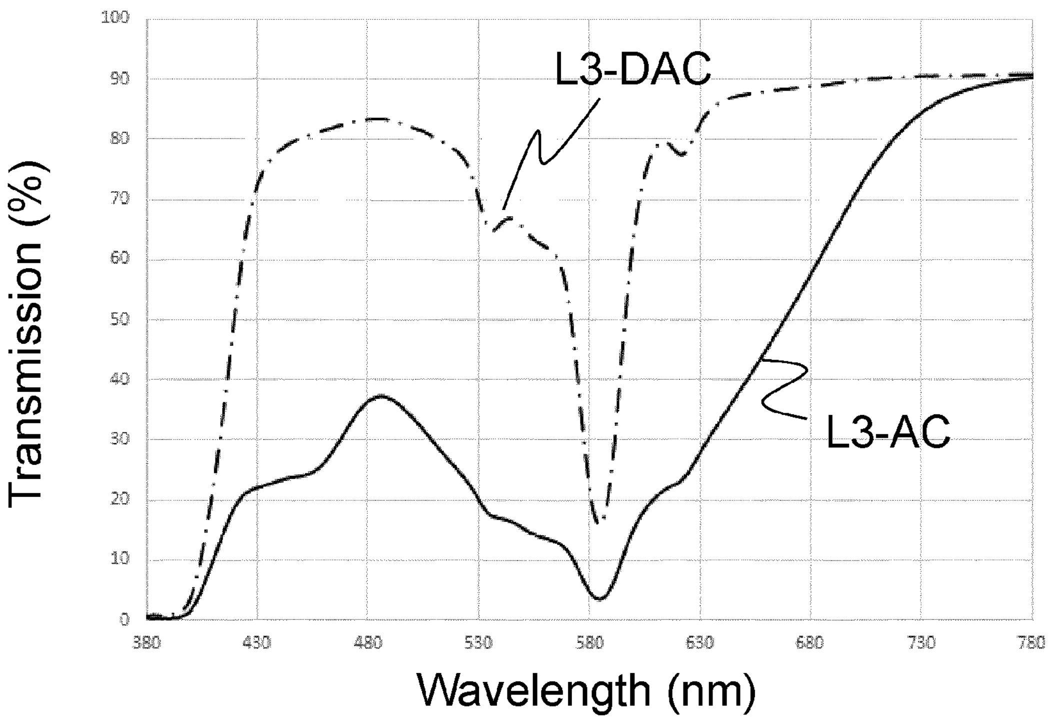
Figure 5:
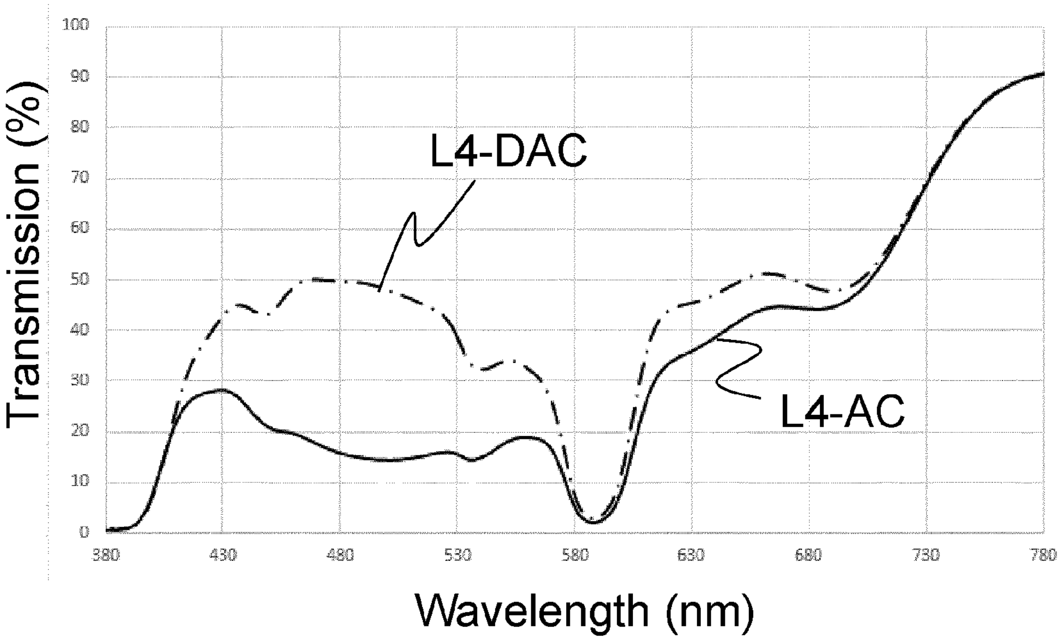
Figure 6:
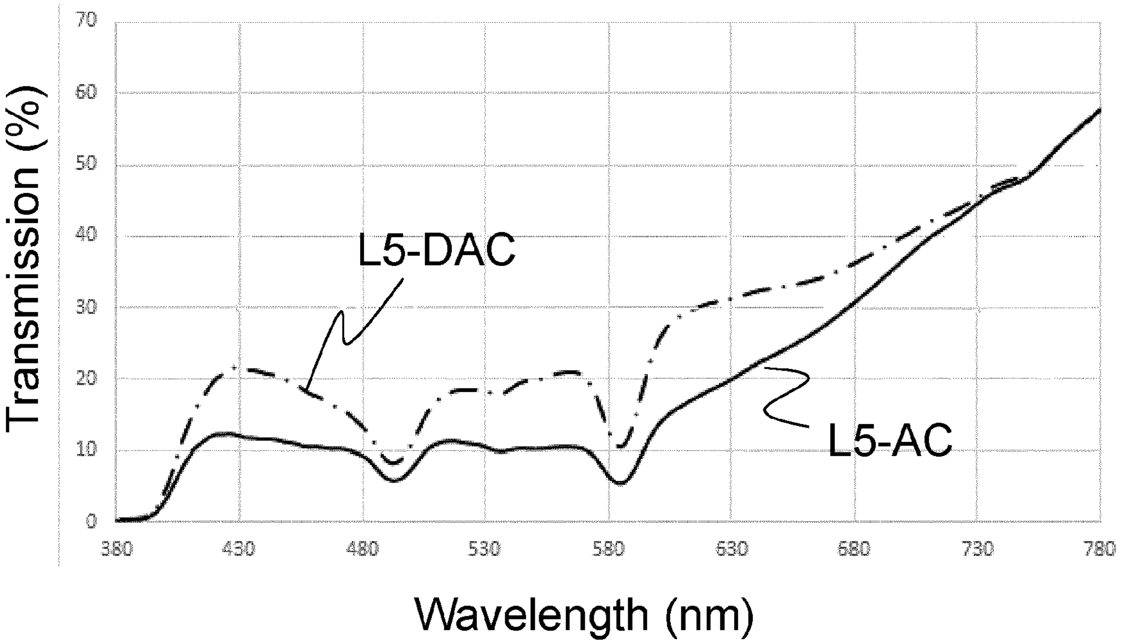
Figure 7:
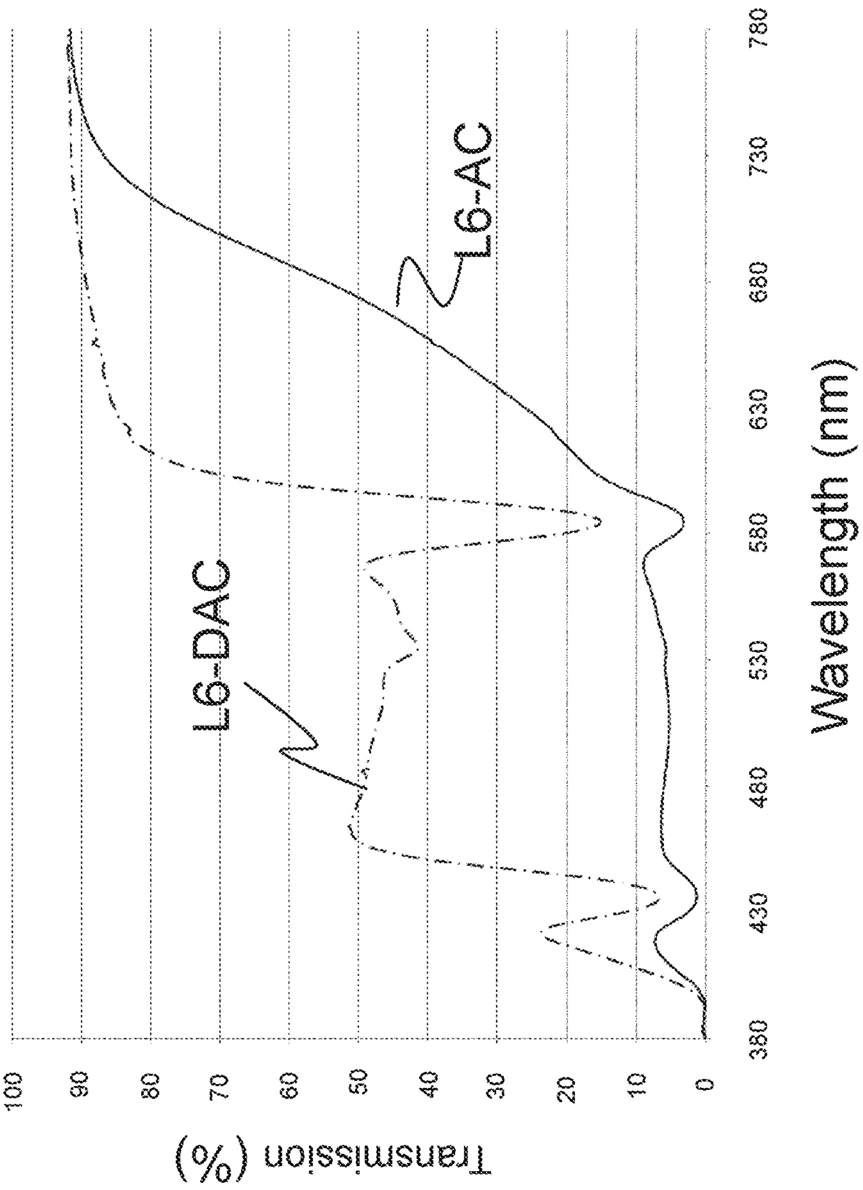
Figure 8:
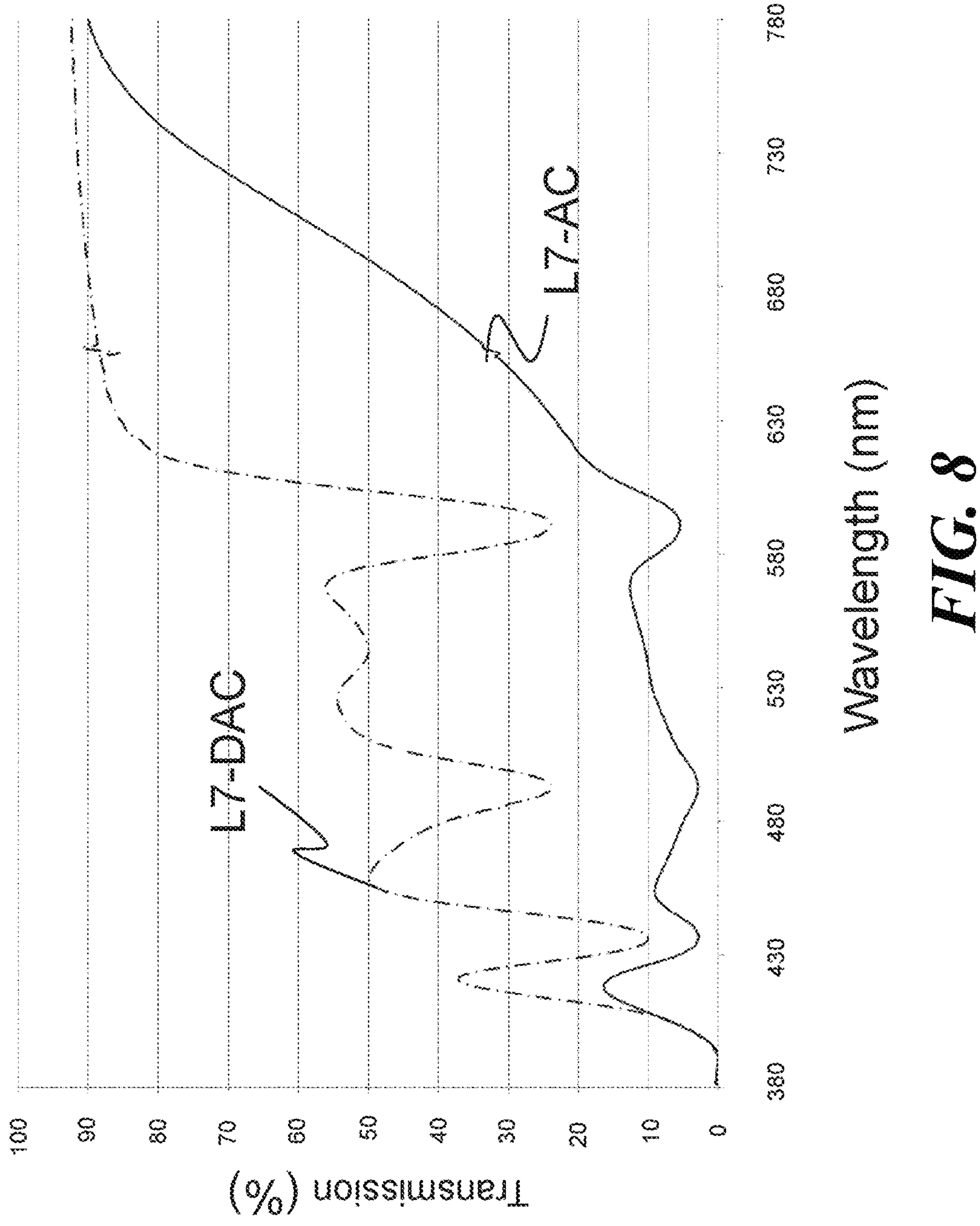
Figure 9:
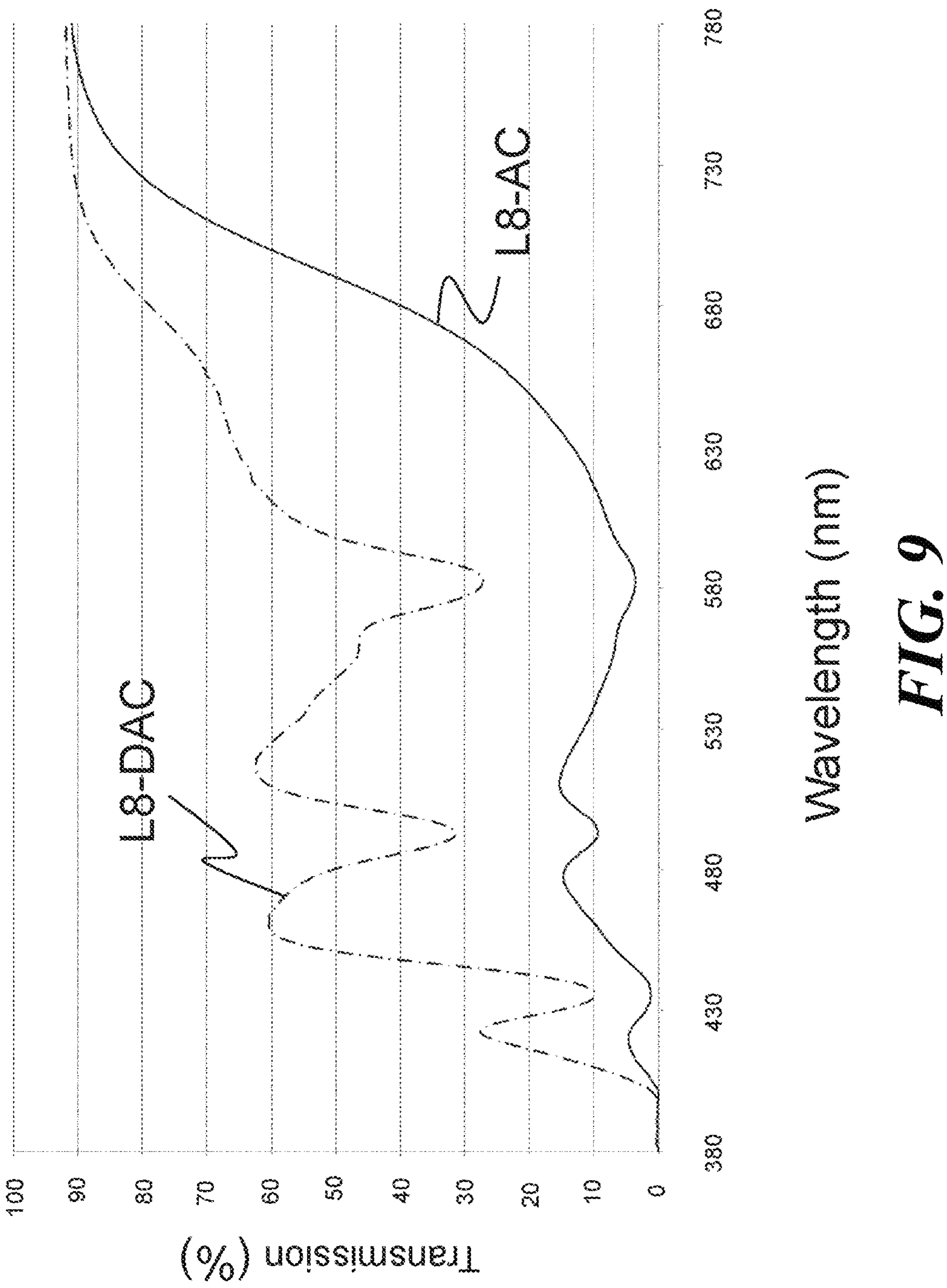
Figure 10:
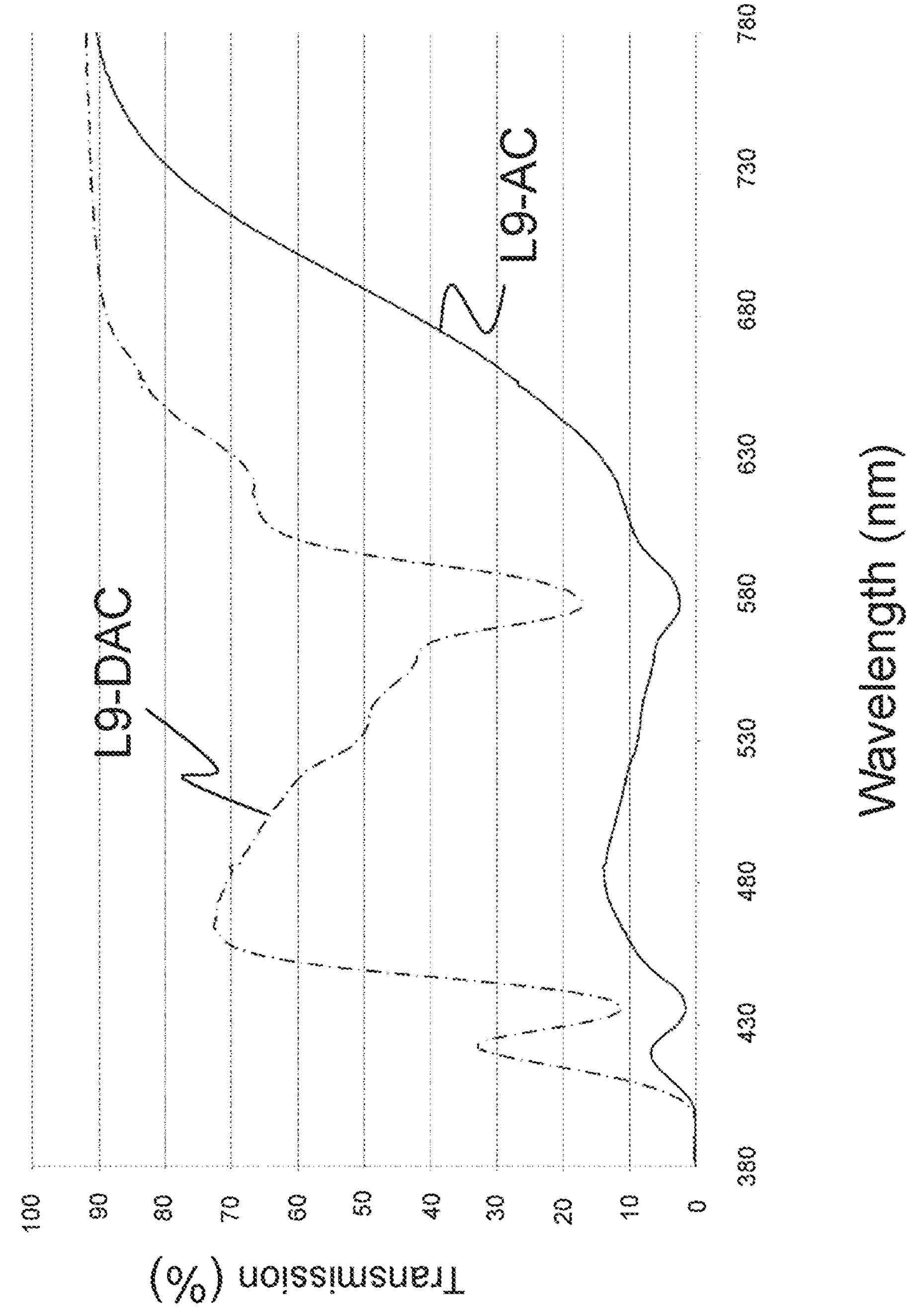

| | | | | |
|---|---|---|---|---|
| 2017/0235160 | A1 | 8/2017 | Larson | |
| 2017/0299895 | A1* | 10/2017 | Larson | G02B 5/223 |

FOREIGN PATENT DOCUMENTS

| | | | |
|---|---|---|---|
| WO | 2010105123 | A1 | 9/2010 |
| WO | 2016118193 | A1 | 7/2016 |
| WO | 2020064963 | A1 | 4/2020 |

OTHER PUBLICATIONS

Crano, "Chromogenic Materials (Photochromic)", Kirk-Othmer Encyclopedia of Chemical Technology, 4th Ed., pp. 321-331 (1993).
Eisenbach, "New Aspects of Photochromism in Bulk Polymers", Photographic Science and Engineering, pp. 183-190 (1979).
McCamy et al., "A Color-Rendition Chart", Journal of Applied Photographic Engineering 2(3), pp. 95-99 (1976).
International Search Report and Written Opinion dated Nov. 11, 2022, in corresponding International Application No. PCT/EP2022/071561, 8 pages.
Chinese First Office Action dated Apr. 17, 2026 in corresponding Chinese Application No. 202280055697.5, translated, 16 pages.

* cited by examiner

OPHTHALMIC ARTICLES

CROSS-REFERENCE TO RELATED APPLICATION(S)

This application is a national stage entry from International Application No. PCT/EP2022/071561, filed on Aug. 1, 2022, in the Receiving Office ("RO/EP") of the European Patent Office ("EPO"), published as International Publication No. WO 2023/016842 A1 on Feb. 16, 2023. International Application No. PCT/EP2022/071561 claims priority under 35 U.S.C. § 119 from European Patent Application Ser. No. 21191222.5, filed on Aug. 13, 2021, in the EPO. The entire contents of the above-listed applications are incorporated herein by reference.

The present invention relates to an ophthalmic article, in particular for sunglasses.

The term "ophthalmic article" is specifically understood to mean a lens, corrective or otherwise, that can be used as spectacle glass, for spectacles for example particularly sunglasses, goggles, visors or the like.

The discussion of the background of the invention herein is included to explain the context of the invention. This is not to be taken as an admission that any of the material referred to was published, known or part of the common general knowledge at the priority date of any of the claims.

Wearing sunglasses, in particular when it is very bright outside, is medically recommended to preserve one's long-term vision potential and also for safety reasons, for example when driving.

Specifically, sunglasses form a barrier to UV (ultraviolet) rays. Many studies have shown that UV rays may engender lesions, inflammations or degradation of the cornea, of the crystalline lens or of the retina. In order to avoid these effects and above all a modification of the eye that could decrease vision long-term, people are increasingly encouraged to wear sunglasses in order to avoid exposure to too high a light intensity.

In day-to-day situations, ophthalmic articles with photochromic layers for example are well appreciated by the wearer because when outside under sunlight, the photochromic material inside the photochromic layer is activated and widely reduces light transmission, therefore protecting the eyes of the wearer.

On the other side, indoors, the photochromic layer is deactivated or faded and optimized light transmission is assured under these conditions.

However photochromic layers may be scratched when worn and lose their ability to reduce light transmission under sunlight.

In addition, lack of contrast may lead to the wearer of the sunglasses experiencing substantial visual fatigue and may also result in queasiness, or even cause headaches in extreme cases. This decrease in contrast may also lead to difficulties in appreciating perspective in the field of view. For a driver of a vehicle, it is possible that the traffic situation in front of the vehicle will be poorly read, this possibly representing a certain danger to the driver himself and to any other people present.

Accordingly, the present invention aims at overcoming at least one technical problem of the prior art as mentioned above.

In particular, one aim of the invention is to provide an ophthalmic article that optimizes the incident light intensity when being exposed or not to sunlight and which enhances the protection while providing a good contrast and comfort for the wearer in particular when being exposed to sunlight.

The objective of the invention is therefore to provide an improved ophthalmic article allowing the drawbacks of the prior art to be at least partially solved.

With this aim, the invention proposes an ophthalmic article in particular for sunglasses comprising at least a polymer substrate wherein the polymer substrate comprises at least one area with a blend of contrast enhancing dyes and photochromic dyes and wherein the ophthalmic article presents at least in said area with the blend of contrast enhancing dyes and photochromic dyes a contrast level value of $K_{up} \geq 20$, in particular $K_{up} \geq 30$ in the activated state of the photochromic dyes which is higher than the contrast level value in the deactivated state.

Such an ophthalmic article is suited to be worn outside as well as inside buildings. Contrast enhancement reduces visual fatigue of the wearer and contributes to a good perception and an increased visual acuity. In particular when exposed to sunlight, it is even more important to have an enhanced contrast while preventing glare.

Such an ophthalmic article is very comfortable for a wearer and in particular in driving conditions when exposure can change very fast, for example when entering a tunnel on a sunny day.

The ophthalmic article may comprise one or several of the following features taken alone or in combination:

According to one aspect, the ophthalmic article presents a luminous transmittance Tv value according to ISO 12312 of less than 65% in the deactivated state of the photochromic dye.

Furthermore, the luminous transmittance $T_v$ according to ISO standard 13666 may be in the range between 9-18% in the activated state of the photochromic dye, in particular between 11-16% in the activated state of the photochromic dye.

The contrast enhancing dyes are for example narrow band dyes with FWHM within 5-50 nm, in particular 10-30 nm.

In particular, the contrast enhancing dyes present for example one transmission minimum in a range between 470 nm and 500 nm, more specifically in a range between 485 nm and 495 nm.

The contrast enhancing dyes may also present one transmission minimum in a range between 570 nm-600 nm, in particular in a range between 580 nm and 590 nm.

The transmission spectrum presents for example a minimum between 580-590 in the activated state that is less than 6%, in particular less than 4%.

The spectrum presents according to one possible aspect one transmission minimum in a range between 425-435 nm, in particular with a transmission less than 2% in the activated and the deactivated state.

The ophthalmic article may have a transmission at 400 nm that is equal or below 7.5%, preferentially below 5%.

The contrast enhancing dyes and the photochromic dyes may be blended in the polymer bulk.

The ophthalmic article can exhibit a difference of at least two categories according to ISO 12312 between the deactivated state of the photochromic dye and the activated state of the photochromic dye.

The ophthalmic article may exhibit a difference of at least 35% in particular more than 50%, of the Tv value according to ISO 12312 between the deactivated state of the photochromic dye and the activated state of the photochromic dye.

The invention is also related to sunglasses comprising an ophthalmic article as described above.

Other advantages and features will become apparent upon reading the description of the following figures, among which:

FIG. 1 is a schematic cross-sectional view of an example of an embodiment of an ophthalmic article, in particular for sunglasses or spectacles according to the invention, FIGS. 2 to 10 show some examples of transmission spectra of an ophthalmic article according to the invention.

On all the figures, the same elements bear the same reference numbers.

The following embodiments are only examples. Although the description refers to one or several embodiments, the invention is not limited to theses embodiments. In addition, a feature described in relationship with one embodiment may also concern another embodiment even if this is not mentioned expressively. Simple features of different embodiments may also be combined to provide further realizations.

In the present description, by "front" or "back" face of a layer, reference is made to the propagation of the rays of light towards the eye through the ophthalmic lens when an ophthalmic device bearing the ophthalmic lens is worn on a wearer's face. Thus a "front" face is always that which is closest directed toward the user's field of view and a "rear" face is always that which is closest to the eye of the user.

By "upstream" or "downstream" of two elements or layers, one refers to the propagation of the rays of light towards the eye in the same system as presented above. Thus, a first element is disposed upstream of a second element when the light passes through its path towards the eye of the user first through the first element and then through the second element. Conversely, a first element is disposed "downstream" of a second element when the light passes through its path towards the eye of the user first through the second element and then through the first element.

The terms "crystal" or "crystal glass" are understood to mean a glass/optical material of the class 0 according to the standardized international definition of glasses into five categories of light transmission. It is a glass having in the visible spectrum a light transmission range comprised between 80% and 100%, and is most often in polymeric material as usual within the ophthalmic industry.

Class or category of an ophthalmic article refers to the current European standard, EN 1836:2005 and are defined as follows:

- Category 0—80%-100% Tv transmission—for fashion, indoor use, or cloudy days
- Category 1—43%-80% Tv transmission—low sun exposure
- Category 2—18%-43% Tv transmission—medium sun exposure
- Category 3—8%-18% Tv transmission—strong brightness, light reflected of water or snow
- Category 4—3%-8% Tv transmission—intense sunshine for high mountains, glaciers; not for use when driving or on the road.

The standard further states that an +/−2% overlap of +/−2% between categories 0 and 1, 1 and 2 or 2 and 3 is tolerated. This means for example that ophthalmic articles with a transmission of 19% may be considered to belong sold as either to a category 2 or a category 3 ophthalmic article.

The violet/blue part of the visible spectrum is considered between 400-495 nm, the green/yellow part between 495-590 nm and the orange/red part between 590-750 nm.

The ophthalmic article 1 as shown in the FIG. 1 is for example intended to be used for spectacles, in particular sunglasses. To do this, it is only necessary to shape the outer edge 3 according to the desired shape of the frame of the eyeglasses or sunglasses. Alternatively, and within the scope of the disclosure, the ophthalmic article may be intended for goggles, vision visors or the like.

The light incident on the ophthalmic article 1 is shown by the arrow 5 and an eye 7 represents a user. The field of view 13 is thus situated on the side of the arrow 5 and the user looks through the ophthalmic article 1 with his eye 7.

By ophthalmic article 1 is meant a corrective lens or not (plano-lens), finished or semi-finished, suitable for being mounted in a frame, for example a spectacle frame, goggles, a mask or a visor intended to be placed in front of the eyes and forming a screen of visual protection.

The ophthalmic article 1 comprises at least a polymer substrate 9.

The polymer substrate 9 is for example made of a plastic material, thermoset, in particular made of poly(urea-urethane), or thermoplastic plastic material, in particular made of polyamide (PA), like nylon or a polycarbonate, or polyester.

The substrate 9 has a rear face 9R to be oriented toward the eye 7 of the user and a front face 9F to be oriented toward the field of vision 13 of the user. The substrate 9 has a for example a thickness comprised between 0.5 mm and 5 mm, preferentially comprised between 1 mm and 4 mm, most preferably between 1.4 mm and 4 mm or even between 1.5 mm and 3 mm.

However, other thicknesses for substrate 9 can be chosen in function for example of the optical correction of the ophthalmic article 1. In particular, if an optical correction is desired, substrate 9 may have a non-uniform thickness, so that its front face 9F has a different curvature than its rear face 9R.

In this embodiment the ophthalmic article 1 is in particular a plano lens, i.e. a lens considered without optical power.

In another embodiment, the rear face 9R of the substrate 9 may be surface finished for a corrective effect.

According to a non-shown embodiment, the polymer substrate 9 may be composed of several substrates layers fixed together. One of these layers, in particular the one closest to the eye may be crystal and present on the rear side a curvature for optical correction of the users view.

The polymer substrate 9 as a whole comprises a blend of contrast enhancing dyes and photochromic dyes. In a variant, only one or several partial areas 11, or substrate layers, of the polymer substrate 9 comprise a blend of contrast enhancing dyes and photochromic dyes.

The contrast enhancing dyes are in particular narrow band dyes with FWHM (full width at half maximum) within 5-50 nm, in particular 10-30 nm.

Furthermore, the contrast enhancing dyes and thus the spectra (activated and deactivated state) of the ophthalmic article 1 present one transmission minimum in a range between 470 nm and 500 nm, in particular in a range between 485 nm and 495 nm.

Moreover, the contrast enhancing dyes present one further transmission minimum in a range between 570 nm-600 nm, in particular in a range between 580 nm and 590 nm.

Such transmission minima where absorption is highest, can be achieved by one contrast enhancing dye or several cooperating contrast enhancing dyes.

According to one aspect, the contrast enhancing dyes and the photochromic dyes are blended in the polymer bulk. This has the advantage of providing a unique in-mold solution.

Furthermore, with regard to prior art, there is no risk of delamination or of scratches that could alter the properties of the ophthalmic article 1. It also provides a leaner manufacturing process and a simple but efficient lens structure.

Photochromic colorants, dyes or pigments exhibit a reversible change in color when exposed to light radiation involving ultraviolet rays, such as the ultraviolet radiation in sunlight or the light of a mercury lamp. Various classes of photochromic compounds have been synthesized for use in applications in which a sunlight-induced reversible color change or darkening is desired. The most widely described classes of photochromic compounds are spyro-oxazines, spyro-pyrans and fulgides.

The general mechanism responsible for the reversible change in color, i.e., a change in the absorption spectrum in the visible range of light (400-700 nm) exhibited by different types of photochromic compounds has been described and categorized. See John C. Crano, "Chromogenic Materials (Photochromic)", Kirk-Othmer Encyclopedia of Chemical Technology, Fourth Edition, 1993, pp. 321-332, incorporated herein by reference. The general mechanism for the most common classes of photochromic compounds involves an electronic mechanism causing the transformation of a colorless open ring form into a colored closed ring form.

In the afore described mechanisms, the photochromic dyes require an environment in which they can reversibly transform. In solid polymer matrices, the rates at which the photochromic processes of activation, i.e., formation of color or darkening, and fading, i.e., the return to the original or "colorless" or "less colored" state, occur are believed to be dependent on the free volume in the polymer matrix. The free volume of the polymer matrix is dependent upon the flexibility of the chain segments of the polymer environment surrounding the photochromic compound, i.e., the local mobility or local viscosity of the chain segments comprising the matrix. See Claus D. Eisenbach, "New Aspects of Photochromism in Bulk Polymers", Photographic Science and Engineering, 1979, pp. 183-190, incorporated herein by reference. One of the main obstacles reported by Claus D. Eisenbach, for the larger commercial application of photochromic systems, is the slow rate of photochromic activation and fade in a solid polymer matrix.

The use of photochromic dyes in polyurethanes to produce optical articles has been described in U.S. Published Patent Application 2001/0050356, and references cited therein.

Following photochromic dyes in particular naphthopyrans, or indeno-fused naphthopyrans may be used.

Such an ophthalmic article 1 provides to the wearers the ability to see better in a wide range of light conditions i.e. distinguishing and recognizing the colors both in full sun and in cloudy conditions. Contrast enhancement is achieved in both states (activated and deactivated state), The disclosure enables that the contrast is even more enhanced in the activated state with respect to the deactivated state.

The ophthalmic article 1 presents for the whole polymer substrate 9 or at least in said area 11 with the blend of contrast enhancing dyes and photochromic dyes a contrast level value $K_{up} \geq 20$, in particular $K_{up} \geq 30$.

The ophthalmic article 1 exhibits a difference of at least two categories according to ISO 12312 between the deactivated state of the photochromic dye and the activated state of the photochromic dye.

The ophthalmic article 1 exhibits a difference of at least 35% in particular more than 50%, of the Tv value according to ISO 12312 between the deactivated state of the photochromic dye (not exposed to sunlight or to UV light) and the activated state of the photochromic dye (exposed to sunlight or to UV light).

For reminder, the luminous transmittance in ISO standard 13666 is defined as:

$$\tau_v = 100 \times \frac{\int_{380\,nm}^{780\,nm} \tau(\lambda) \cdot V(\lambda) \cdot S_{D65\lambda}(\lambda) \cdot d\lambda}{\int_{380\,nm}^{780\,nm} V(\lambda) \cdot S_{D65\lambda}(\lambda) \cdot d\lambda} \%$$

where $\tau(\lambda)$ is the spectral transmittance of the tinted spectacle lens;

$V(\lambda)$ is the spectral luminous efficiency function for daylight (see ISO/CIE 10527);

$S_{D65\lambda}(\lambda)$ is the spectral distribution of radiation of CIE standard illuminant D 65 (see ISO/CIE 10526).

An ophthalmic article 1 exhibiting photochromic properties as stated above shows a different luminous transmittance value Tv whether exposed or not to light containing UV light (for example sunlight) to activate the photochromic dye, pigment or colorant.

In this case, the ophthalmic article exhibits two "functioning states", an activated or "dark" state when exposed to light containing UV light and a deactivated or "faded" state when not exposed to light containing UV light.

In this context, treatments conferring additional functions, either alone or in combination among the following non-exhaustive list: shockproof, anti-scratch, anti-abrasion, anti-fouling, anti-fogging, anti-static may be deposited on the substrate 9, in particular on front face 9F or the rear face 9R with negligible influence of the transmission spectra of the ophthalmic article 1.

A polar insert or an interference mirror may also be deposited on front face 9F.

Furthermore, the disclosure enables that the ophthalmic article 1 has in particular in the activated state the capability to increase perceived separation of colors—variation of Chroma—present in the field of view of the article wearer in having in the activated state of the photochromic dye a score $K_{up} \geq 20$, and in particular $K_{up} \geq 30$ in the contrast enhancement metric.

Kup (KOLOR UP SCORE) is a contrast enhancement metric determined by looking at how much the Chroma value $C^*_{ab}$ is increased comparing the vision with the lens and without it. The higher is the delta Chroma the greater is the color perception and the higher Kup.

The delta Chroma is measured on a chosen palette of colors called colorchecker (see for example the link https://en.wikipedia.org/wiki/ColorChecker) which is a color calibration target consisting of an arrangement of 24 squares of colored samples, for example painted on cardboard in a frame. The ColorChecker was introduced in a 1976 paper by McCamy, Marcus, and Davidson in the Journal of Applied Photographic Engineering (C. S. McCamy, H. Marcus, and J. G. Davidson (1976). "A Color-Rendition Chart". Journal of Applied Photographic Engineering 2 (3). 95-99).

For every one of these given colors of the chosen color palette, one determines a delta Chroma value resulting from the comparison of observation with the colored lens or filter and without it.

One may then determine a relative or "normalized" delta Chroma value by dividing the delta Chroma by the initial un-filtered Chroma value.

The 24 colors of the cardboard-framed arrangement of squares of painted samples are defined without lens with a D50 illuminant:

| Sample No | Color name | L* | a* | b* |
|---|---|---|---|---|
| 1 | dark skin | 37.986 | 13.555 | 14.059 |
| 2 | light skin | 65.711 | 18.13 | 17.81 |
| 3 | blue sky | 49.927 | −4.88 | −21.925 |
| 4 | Foliage | 43.139 | −13.095 | 21.905 |
| 5 | blue flower | 55.112 | 8.844 | −25.399 |
| 6 | bluish green | 70.719 | −33.397 | −0.199 |
| 7 | Orange | 62.661 | 36.067 | 57.096 |
| 8 | purblish blue | 40.02 | 10.41 | −45.964 |
| 9 | moderate red | 51.124 | 48.239 | 16.248 |
| 10 | Purple | 30.325 | 22.976 | −21.587 |
| 11 | yellow green | 72.532 | −23.709 | 57.255 |
| 12 | orange yellow | 71.941 | 19.363 | 67.857 |
| 13 | Blue | 28.778 | 14.179 | −50.297 |
| 14 | Green | 55.261 | −38.342 | 31.37 |
| 15 | Red | 42.101 | 53.378 | 28.19 |
| 16 | Yellow | 81.733 | 4.039 | 79.819 |
| 17 | Magenta | 51.935 | 49.986 | −14.574 |
| 18 | Cyan | 51.038 | −28.631 | −28.638 |
| 19 | white (.05*) | 96.539 | −0.425 | 1.186 |
| 20 | neutral 8 (.23*) | 81.257 | −0.638 | −0.335 |
| 21 | neutral 6.5 (.44*) | 66.766 | −0.734 | −0.504 |
| 22 | neutral 5 (.70*) | 50.867 | −0.153 | −0.27 |
| 23 | neutral 3.5 (1.05*) | 35.656 | −0.421 | −1.231 |
| 24 | Black | 20.461 | −0.079 | −0.973 |

This table give thus for the standard color palette the unfiltered Chroma value, meaning without lens which may be designated by $C_{SP*ab}$ (index SP means here standard palette).

For every of these colors i (i=1 to 24) a filtered Chroma value is measured, meaning with lens which may be designated by $C_{LF*ab}$ (index LF means here lens filtered). These measurement values give thus for the standard color palette the filtered Chroma value $C_{LF*ab}$.

For every color i (i=1 to 24), a Delta Chroma ratio may be calculated as $$\Delta C_i^* = \frac{(C_{LFab}^*(i) - C_{SPab}^*(i))^2}{(C_{SPab}^*(i))^2}$$

The higher is the delta Chroma the greater is the color perception.

Then the Kup (Kolor up score) is determined as the average of the 6 highest normalized delta Chroma ratio selected among these 24 colors of the color palette, which is then multiplied by 100 for ease of reading.

$$Kup = 100 * \frac{1}{6}\sum_{k=1}^{6} \overline{\text{MAX}(i = 1 - 24)\Delta C_i^*}^{6} \text{ where } \overline{\text{MAX}(i = 1 - 24)\Delta C_i^*}^{6}$$

are the six highest normalized delta Chroma ratio among these 24 colors of the color palette.

Standard ISO/CIE 11664-4 specifies in its part 4 the method of calculating and measuring the coordinates in the CIE 1976 L*a*b* colour space including correlates of lightness, Chroma and hue. Values a* and b* are the colorimetric coordinates in the CIELAB 1976 color space. And Chroma $C^*_{ab}$ is defined by $$C_{ab}^* = \left[(a^*)^2 + (b^*)^2\right]^{1/2}$$

For the measurements of the Chroma values, the ISO standard conditions are applied in particular a 1500 lx, illuminator D65 which is used for illumination.

FIG. 2-10 show examples of transmission spectra of different ophthalmic articles 1 according to the invention.

References are as follows:

Spectrum L 1-DAC means spectrum of example 1 in the deactivated state.

Spectrum L 1-AC means spectrum of example 1 in the activated state.

All spectra shown in the figures are also reproduced in a table showing the respective transmission values in the activated (AC) and the deactivated state (DAC) of the photochromic dyes of the ophthalmic article 1.

EXAMPLE 1—FIG. 2

Spectrum L1-DAC corresponds to a spectrum where the photochromic dye is faded or deactivated.

Spectrum L1-AC corresponds to a spectrum where the photochromic dye is dark or activated.

This ophthalmic article 1 belongs to Cat 1 (Tv=51%) in the faded or deactivated state and to Cat 3 (Tv=15%) in the dark or activated state. In this example, photochromism allows a jump or pass two categories between the activated and the deactivated state according to current European standard, EN 1836:2005.

Spectrum L1-DAC presents a first maximum at 416 nm with a transmission value of 8.94%. At 430 nm, spectrum L1-DAC presents a first minimum with a transmission value of 0.35%. In a range between 425 nm and 435 nm, the transmission value is lower than 2% which allows filtering efficiently a part of the spectrum known as "the bad blue" even in the deactivated state.

Around 473+/−2 nm, L1-DAC presents a second maximum with a transmission value of 77.77%. In a range between 450 nm and 525 nm the transmission value is higher than 60% allowing efficient transmission of the part of the spectrum known as "good blue components" of the light that have in particular positive influence on the circadian rhythm of the wearer.

A second relative minimum is reached at 555 nm with a transmission value of 42.18%.

A third maximum is reached at 562 nm with a transmission value of 43.19%.

A third minimum is reached at 583 nm with a transmission value of 12.08%. This is an absorption peak due a contrast enhancing dye.

Above 600 nm, the transmission value is higher than 49% and above 615 nm the transmission value is higher than 80%.

Spectrum L1-AC presents a first maximum at 414 nm with a transmission value of 4.50%. At 430 nm, spectrum L1-AC presents a first minimum with a transmission value of 0.05%. In a range between 425 nm and 435 nm, the transmission value is lower than 0.7% which allows filtering efficiently the "bad blue" even in the activated state.

Around 474+/−2 nm, L1-AC presents a second maximum with a transmission value of 29.00%. In a range between 450 nm and 525 nm the transmission value is higher than 18% allowing efficient transmission of good blue components of the light that have positive influence on the circadian rhythm of the wearer.

A second minimum is reached at 583 nm with a transmission value of 2.84%. This is an absorption peak due a contrast enhancing dye.

Above 600 nm, the transmission value is higher than 10% and above 680 nm the transmission value is higher than 50% with an increasing slope that is less pronounced than in the deactivated state.

For example 1, Kup=25 in the deactivated state and Kup=34 in the activated state.

At 400 nm, the transmission is 0.7% in the deactivated state and 0.2% in the activated state. For wavelengths less than 400 nm, the transmission value is very low and protects the eyes efficiently for harmful UV-light.

EXAMPLE 2—FIG. 3

Spectrum L2-DAC corresponds to a spectrum where the photochromic dye is faded or deactivated.

Spectrum L2-AC corresponds to a spectrum where the photochromic dye is dark or activated.

This ophthalmic article 1 of this example 2 belongs to Cat 1 (Tv=74%) in the faded or deactivated state and to Cat 3 (Tv=13%) in the dark or activated state. Photochromism allows a jump of two categories between the activated and the deactivated state.

Spectrum L2-DAC and L2-AC differ from L1-DAC and L1-AC by the fact the ophthalmic article 1 of this example does not exhibit a specific "bad blue" filtering function between 425 nm and 430 nm.

Spectrum L2-DAC presents a first maximum at 458 nm with a transmission value of 67.35%. In the range above 440 nm, the transmission value is above 50%.

At 493 nm, spectrum L2-DAC presents a first minimum with a transmission value of 50.17%. This is an absorption peak due a contrast enhancing dye.

Then spectrum L2-DAC reaches a second maximum at 515 nm with a transmission value of 74.35%. A second relative minimum is reached at 534 nm with a transmission value of 70.31% and a third maximum is reached at 556 nm with a transmission value of about 77%.

A third minimum is reached at 585 nm with a transmission value of 52.15%. This is an absorption peak due a contrast enhancing dye.

Spectrum L2-AC presents a first maximum at 444 nm with a transmission value of 15.51%. In the range above 440 nm, the transmission value is above 9%.

At 493 nm, spectrum L2-AC presents a first minimum with a transmission value of 9.75%. This is an absorption peak due a contrast enhancing dye.

Then spectrum L2-AC reaches a second maximum at 568 nm with a transmission value of 22.77%.

A second minimum is reached at 585 nm with a transmission value of 16.76%. This is an absorption peak due a contrast enhancing dye.

The ophthalmic article 1 according to the second example shows improved contrast enhancing properties because the minima at respective 493 nm and 585 nm separate respectively the violet/blue part spectrum from the green/yellow one and the green/yellow part spectrum from the orange/red one.

For example 2, Kup=5 in the deactivated state and Kup=21 in the activated state.

At 400 nm, the transmission is 1.6% in the deactivated state and 0.9% in the activated state. For wavelengths less than 400 nm, the transmission value is very low and protects the eyes efficiently for harmful UV-light.

Examples 1 and 2 are in particular well suited for sunglasses (with or without optical vision correction) for drivers.

Turning now to examples 3-5 that have in common to differ only by one category between the activated state on the one hand and the deactivated state on the other hand. Neither of these examples 3-5 exhibits a "bad blue" filtering function. Every example 3-5 (like examples 1 and 2) shows contrast enhancing feature between the green/yellow part of the visible spectrum and the orange/red part one with an absorption peak around 585+/−5 nm. In addition, example 5 shows contrast enhancing feature between the violet/blue part of the spectrum and the green/yellow part one with an absorption peak around 485+/−5 nm.

Examples 3-5 are more for example suited for example for sport activities in particular outside.

EXAMPLE 3—FIG. 4

Spectrum L3-DAC corresponds to a spectrum where the photochromic dye is faded or deactivated.

Spectrum L3-AC corresponds to a spectrum where the photochromic dye is dark or activated.

This ophthalmic article 1 of this example belongs to Cat 1 (Tv=64%) in the faded or deactivated state and to Cat 2 (Tv=19%) in the dark or activated state. Photochromism allows a jump or pass one category between the activated and the deactivated state.

Spectrum L3-DAC presents a first maximum at 485 nm with a transmission value of 83.42%. In the range between 440 nm and 530 nm, the transmission value is above 70%.

At 536 nm, spectrum L3-DAC presents a first minimum with a transmission value of 64.83%.

Then spectrum L3-DAC reaches a second maximum at 544 nm with a transmission value of 66.87%.

A second minimum is reached at 585 nm with a transmission value of 15.86%. This is an absorption peak due a contrast enhancing dye.

Above 600 nm, the transmission value is higher than 60%.

Spectrum L3-AC presents a first maximum at 486 nm with a transmission value of 37.2%. In the range between 440 nm and 530 nm, the transmission value is above 20%.

At 585 nm, spectrum L3-AC presents a first minimum with a transmission value of 3.48%. This is an absorption peak due a contrast enhancing dye.

Above 610 nm, the transmission value is higher than 20%.

For example 3, Kup=15 in the deactivated state and Kup=30 in the activated state.

At 400 nm, the transmission is 0.8% in the deactivated state and 0.5% in the activated state. For wavelengths less than 400 nm, the transmission value is very low and protects the eyes efficiently for harmful UV-light.

EXAMPLE 4—FIG. 5

Spectrum L4-DAC corresponds to a spectrum where the photochromic dye is faded or deactivated.

Spectrum L4-AC corresponds to a spectrum where the photochromic dye is dark or activated.

This ophthalmic article 1 of this example belongs to Cat 2 (Tv=33%) in the faded or deactivated state and to Cat 3

(Tv=16%) in the dark or activated state. Photochromism allows a jump or pass one category between the activated and the deactivated state.

Spectrum L4-DAC presents a first maximum at 469 nm with a transmission value of 50.06%. In the range between 440 nm and 525 nm, the transmission value is above 40%.

At 540 nm, spectrum L4-DAC presents a minimum with a transmission value of 32.32%.

Then spectrum L4-DAC reaches a second maximum at 552 nm with a transmission value of 34.02%.

Another minimum is reached at 588 nm with a transmission value of 2.86%. This is an absorption peak due a contrast enhancing dye.

Above 610 nm, the transmission value is higher than 30%.

Spectrum L4-AC presents a first maximum at 429 nm with a transmission value of 28.19%. In the range between 440 nm and 530 nm, the transmission value is above 10% and lower than 30%.

At 588 nm, spectrum L4-AC presents a minimum with a transmission value of 2.04%. This is an absorption peak due a contrast enhancing dye.

Above 630 nm, the transmission value is higher than 30%.

For example 4, Kup=18 in the deactivated state and Kup=40 in the activated state.

At 400 nm, the transmission is 0.7% in the deactivated state and 0.6% in the activated state. For wavelengths less than 400 nm, the transmission value is very low and protects the eyes efficiently for harmful UV-light.

EXAMPLE 5—FIG. 6

Spectrum L5-DAC corresponds to a spectrum where the photochromic dye is faded or deactivated.

Spectrum L5-AC corresponds to a spectrum where the photochromic dye is dark or activated.

This ophthalmic article 1 of this example belongs to Cat 2 (Tv=20%) in the faded or deactivated state and to Cat 3 (Tv=11%) in the dark or activated state.

Photochromism allows a jump or pass one category between the activated and the deactivated state.

Spectrum L5-DAC presents a first maximum at 429 nm with a transmission value of 21.71%.

In the range between 440 nm and 480 nm, the transmission value is above 10%.

At 492 nm, spectrum L5-DAC presents a minimum with a transmission value of 8.28%. This is an absorption peak due a contrast enhancing dye.

Then spectrum L5-DAC reaches a second maximum at 528 nm with a transmission value of 18.5%.

Another minimum is reached at 585 nm with a transmission value of 10.57%. This is an absorption peak due a contrast enhancing dye.

Above 600 nm, the transmission value is higher than 25%.

Spectrum L5-AC presents a first maximum at about 425 nm with a transmission value of about 12%. In the range between 440 nm and 470 nm, the transmission value is above 10% and lower than 20%.

At about 490 nm, spectrum L5-AC presents a minimum with a transmission value of about 6%. This is an absorption peak due a contrast-enhancing dye.

Above 635 nm, the transmission value is higher than 20%.

Then spectrum L5-AC reaches a second maximum at about 515 nm with a transmission value of about 11%.

Another minimum is reached about 585 nm with a transmission value of about 5%. This is an absorption peak due a contrast-enhancing dye.

For example 5, Kup=20 in the deactivated state and Kup=28 in the activated state.

At 400 nm, the transmission is 0.4% in the deactivated state and 0.2% in the activated state. For wavelengths less than 400 nm, the transmission value is very low and protects the eyes efficiently for harmful UV-light.

EXAMPLE 6—FIG. 7

Spectrum L6-DAC corresponds to a spectrum where the photochromic dye is faded or deactivated.

Spectrum L6-AC corresponds to a spectrum where the photochromic dye is dark or activated.

This ophthalmic article 1 belongs to Cat 1 (Tv=48%) in the faded or deactivated state and to Cat 3 (Tv=9%) in the dark or activated state. In this example, photochromism allows a jump or pass two categories between the activated and the deactivated state according to current European standard, EN 1836:2005.

Spectrum L6-DAC presents a first maximum at 422 nm with a transmission value of 23.74%. At 436 nm, spectrum L6-DAC presents a first minimum with a transmission value of 6.68%. In a range between 430 nm and 440 nm, the transmission value is lower than 10% which allows filtering a part of the spectrum known as "the bad blue" even in the deactivated state.

Around 464+/−2 nm, L6-DAC presents a second maximum with a transmission value of 51.36%. In a range between 450 nm and 525 nm the transmission value is higher than 40% allowing efficient transmission of the part of the spectrum known as "good blue components" of the light that have in particular positive influence on the circadian rhythm of the wearer.

A second relative minimum is reached at 536 nm with a transmission value of 41.48%.

A third maximum is reached at 567 nm with a transmission value of 49.21%.

A third minimum is reached at 585 nm with a transmission value of 15.18%. This is an absorption peak due a contrast enhancing dye.

Above 600 nm, the transmission value is higher than 60% and above 615 nm the transmission value is higher than 80%.

Spectrum L6-AC presents a first maximum at 418 nm with a transmission value of 7.29%. At 436 nm, spectrum L6-AC presents a first minimum with a transmission value of 1.24%. In a range between 430 nm and 440 nm, the transmission value is lower than 2.5% which allows filtering efficiently the "bad blue" even in the activated state.

Around 464+/−2 nm, L6-AC presents a second maximum with a transmission value of 6.39%. In a range between 450 nm and 525 nm the transmission value is higher than 5% allowing transmission of good blue components of the light that have positive influence on the circadian rhythm of the wearer.

A second minimum is reached at 585 nm with a transmission value of 3.14%. This is an absorption peak due a contrast enhancing dye.

Above 600 nm, the transmission value is higher than 10% and above 680 nm the transmission value is higher than 50% with an increasing slope that is less pronounced than in the deactivated state.

For example 6, Kup=21 in the deactivated state and Kup=46 in the activated state.

At 400 nm, the transmission is 2.9% in the deactivated state and 1.3% in the activated state. For wavelengths less than 400 nm, the transmission value is very low and protects the eyes efficiently for harmful UV-light.

EXAMPLE 7—FIG. 8

Spectrum L7-DAC corresponds to a spectrum where the photochromic dye is faded or deactivated.

Spectrum L7-AC corresponds to a spectrum where the photochromic dye is dark or activated.

This ophthalmic article 1 belongs to Cat 1 (Tv=51%) in the faded or deactivated state and to Cat 3 (Tv=11%) in the dark or activated state. In this example, photochromism allows a jump or pass two categories between the activated and the deactivated state according to current European standard, EN 1836:2005.

Spectrum L7-DAC presents a first maximum at 421 nm with a transmission value of 37.16%. At 436 nm, spectrum L7-DAC presents a first minimum with a transmission value of 10.07%. In a range between 430 nm and 440 nm, the transmission value is lower than 17% which allows filtering a part of the spectrum known as "the bad blue" even in the deactivated state.

Around 459+/−2 nm, L7-DAC presents a second maximum with a transmission value of 49.97%.

In a range between 450 nm and 525 nm the transmission value is higher than 20% allowing transmission of the part of the spectrum known as "good blue components" of the light that have in particular positive influence on the circadian rhythm of the wearer.

At 493 nm, spectrum L7-DAC presents a minimum with a transmission value of 23.81%. This is an absorption peak due a contrast enhancing dye.

Then spectrum L7-DAC reaches a second maximum at 526 nm+/−2 nm with a transmission value of 54.48%.

Another minimum is reached at 591 nm with a transmission value of 23.86%. This is an absorption peak due a contrast enhancing dye.

Above 600 nm, the transmission value is higher than 35% and above 615 nm the transmission value is higher than 75%.

Spectrum L7-AC presents a first maximum at 418 nm with a transmission value of 16.41%. At 436 nm, spectrum L7-AC presents a first minimum with a transmission value of 2.84%. In a range between 430 nm and 440 nm, the transmission value is lower than 6% which allows filtering the "bad blue" in the activated state.

Around 453+/−2 nm, L7-AC presents a second maximum with a transmission value of 9.14%.

At 493 nm, spectrum L7-AC presents a minimum with a transmission value of 2.91%. This is an absorption peak due a contrast enhancing dye.

Then spectrum L7-AC reaches a second maximum at 569 nm+/−2 nm with a transmission value of 12.67%.

Another minimum is reached at 590 nm with a transmission value of 5.51%. This is an absorption peak due a contrast enhancing dye.

Above 600 nm, the transmission value is higher than 8% and above 615 nm the transmission value is higher than 17.5%.

For example 7, Kup=16 in the deactivated state and Kup=33 in the activated state.

At 400 nm, the transmission is 3% in the deactivated state and 2.9% in the activated state. For wavelengths less than 400 nm, the transmission value is very low and protects the eyes efficiently for harmful UV-light.

Spectrum L7-DAC exhibit specific "bad blue" filtering function between 425 nm and 430 nm and two absorption peaks (at 495+/−2 nm and 590+/−2 nm) for contrast enhancing.

EXAMPLE 8—FIG. 9

Spectrum L8-DAC corresponds to a spectrum where the photochromic dye is faded or deactivated.

Spectrum L8-AC corresponds to a spectrum where the photochromic dye is dark or activated.

This ophthalmic article 1 belongs to Cat 1 (Tv=50%) in the faded or deactivated state and to Cat 3 (Tv=9%) in the dark or activated state. In this example, photochromism allows a jump or pass two categories between the activated and the deactivated state according to current European standard, EN 1836:2005.

Spectrum L8-DAC presents a first maximum at 422 nm with a transmission value of 27.60%. At 436 nm, spectrum L8-DAC presents a first minimum with a transmission value of 9.79%. In a range between 430 nm and 440 nm, the transmission value is lower than 17% which allows filtering a part of the spectrum known as "the bad blue" even in the deactivated state.

Around 460+/−2 nm, L7-DAC presents a second maximum with a transmission value of 60.40%.

In a range between 450 nm and 525 nm the transmission value is higher than 30% allowing transmission of the part of the spectrum known as "good blue components" of the light that have in particular positive influence on the circadian rhythm of the wearer.

At 493 nm, spectrum L8-DAC presents a minimum with a transmission value of 31.45%. This is an absorption peak due a contrast enhancing dye.

Then spectrum L8-DAC reaches a second maximum at 516 nm+/−2 nm with a transmission value of 62.49%.

Another minimum is reached at 583 nm with a transmission value of 27.13%. This is an absorption peak due a contrast enhancing dye.

Above 600 nm, the transmission value is higher than 50% and above 615 nm the transmission value is higher than 60%.

Spectrum L8-AC presents a first maximum at 421 nm+/−2 nm with a transmission value of 4.67%. At 436 nm, spectrum L8-AC presents a first minimum with a transmission value of 1.18%. In a range between 430 nm and 440 nm, the transmission value is lower than 2% which allows efficient filtering the "bad blue" in the activated state.

Around 479+/−2 nm, L8-AC presents a second maximum with a transmission value of 14.76%.

At 492 nm, spectrum L8-AC presents a minimum with a transmission value of 9.43%. This is an absorption peak due a contrast enhancing dye.

Then spectrum L8-AC reaches a second maximum at 512 nm+/−2 nm with a transmission value of 15.39%.

Another minimum is reached at 582 nm+/−2 nm with a transmission value of 3.60%. This is an absorption peak due a contrast enhancing dye.

Above 600 nm, the transmission value is higher than 9% and above 620 nm the transmission value is higher than 10%.

For example 8, Kup=11 in the deactivated state and Kup=25 in the activated state.

At 400 nm, the transmission is 0.6% in the deactivated state and 0% in the activated state. For wavelengths less than 400 nm, the transmission value is very low and protects the eyes efficiently for harmful UV-light.

Spectrum L8-DAC exhibit specific "bad blue" filtering function between 425 nm and 430 nm and two absorption peaks (at 495+/−2 nm and 590+/−2 nm) for contrast enhancing.

EXAMPLE 9—FIG. 10

Spectrum L9-DAC corresponds to a spectrum where the photochromic dye is faded or deactivated.

Spectrum L9-AC corresponds to a spectrum where the photochromic dye is dark or activated.

This ophthalmic article 1 belongs to Cat 1 (Tv=49%) in the faded or deactivated state and to Cat 3 (Tv=9%) in the dark or activated state. In this example, photochromism allows a jump or pass two categories between the activated and the deactivated state according to current European standard, EN 1836:2005.

Spectrum L9-DAC presents a first maximum at 422 nm with a transmission value of 32.93%. At 436 nm, spectrum L9-DAC presents a first minimum with a transmission value of 11.34%. In a range between 430 nm and 440 nm, the transmission value is lower than 20% which allows filtering a part of the spectrum known as "the bad blue" even in the deactivated state.

Around 473+/−2 nm, L9-DAC presents a second maximum with a transmission value of 72.14%. In a range between 450 nm and 525 nm the transmission value is higher than 50% allowing efficient transmission of the part of the spectrum known as "good blue components" of the light that have in particular positive influence on the circadian rhythm of the wearer.

A minimum is reached at 578 nm with a transmission value of 17.10%. This is an absorption peak due a contrast enhancing dye.

Above 600 nm, the transmission value is higher than 59% and above 615 nm the transmission value is higher than 65%.

Spectrum L8-AC presents a first maximum at 420 nm+/−2 nm with a transmission value of 6.55%. At 435 nm, spectrum L8-AC presents a first minimum with a transmission value of 1.55%. In a range between 430 nm and 440 nm, the transmission value is lower than 3% which allows filtering the "bad blue" even in the activated state.

A minimum is reached at 579 nm with a transmission value of 2.44%. This is an absorption peak due a contrast enhancing dye.

Above 600 nm, the transmission value is higher than 8% and above 680 nm the transmission value is higher than 40% with an increasing slope that is less pronounced than in the deactivated state.

For example 8, Kup=8 in the deactivated state and Kup=46 in the activated state.

At 400 nm, the transmission is 0.7% in the deactivated state and 0.2% in the activated state. For wavelengths less than 400 nm, the transmission value is very low and protects the eyes efficiently for harmful UV-light.

From the above, one understands that the use and combination of a polymer substrate comprising a blend of photochromic dye and color enhancing dyes allows improving comfort of a wearer under various light conditions.

In particular, a wearer can appreciate a good vision inside or as a driver because the attenuation for examples 1 and 2 is that of a category 1 lens in the faded/deactivated state while being well protected under sunlight where the lens shifts to a category 3 protection in the activated state.

When driving, such ophthalmic articles 1 provide good vision even in fast changing light environments for example due to clouds or tunnels.

The invention claimed is:

1. An ophthalmic article, comprising:

a polymer substrate;

wherein the polymer substrate comprises at least one area with a blend of contrast-enhancing dyes and photochromic dyes, and wherein the ophthalmic article presents, at least in the at least one area with the blend of contrast-enhancing dyes and photochromic dyes, a contrast level value of $K_{up}\geq 20$ in an activated state of the photochromic dyes, which is higher than the contrast level value in a deactivated state of the photochromic dyes.

2. The ophthalmic article of claim 1, wherein the ophthalmic article presents a value of luminous transmittance Tv according to ISO standard 12312 of less than 65% in the deactivated state of the photochromic dyes.

3. The ophthalmic article of claim 1, wherein a value of luminous transmittance Tv according to ISO standard 13666 is greater than or equal to 9% and less than or equal to 18% in the activated state of the photochromic dyes.

4. The ophthalmic article of claim 1, wherein the contrast-enhancing dyes are narrow-band dyes with a full width at half maximum (FWHM) greater than or equal to 5 nanometers (nm) and less than or equal to 50 nm.

5. The ophthalmic article of claim 1, wherein the contrast-enhancing dyes present one transmission minimum at wavelengths greater than or equal to 470 nanometers (nm) and less than or equal to 500 nm.

6. The ophthalmic article of claim 1, wherein the contrast-enhancing dyes present one transmission minimum at wavelengths greater than or equal to 570 nanometers (nm) and less than or equal to 600 nm.

7. The ophthalmic article of claim 1, wherein a transmission spectrum presents a minimum at wavelengths greater than or equal to 580 nanometers (nm) and less than or equal to 590 nm, in the activated state of the photochromic dyes, that is less than 6%.

8. The ophthalmic article of claim 1, wherein a transmission spectrum presents a minimum at wavelengths greater than or equal to 425 nanometers (nm) and less than or equal to 435 nm, with a transmission less than 2% in the activated of the photochromic dyes and in the deactivated state of the photochromic dyes.

9. The ophthalmic article of claim 1, wherein the ophthalmic article has a transmission at 400 nanometers (nm) that is less than or equal to 7.5%.

10. The ophthalmic article of claim 1, wherein the contrast-enhancing dyes and the photochromic dyes are blended in a bulk of the polymer in the polymer substrate.

11. The ophthalmic article of claim 1, where the ophthalmic article exhibits a difference of at least two categories according to ISO standard 12312 between the deactivated state of the photochromic dyes and the activated state of the photochromic dyes.

12. The ophthalmic article of claim 1, where the ophthalmic article exhibits a difference of at least 35% of a value of luminous transmittance Tv according to ISO standard 12312 between the deactivated state of the photochromic dyes and the activated state of the photochromic dyes.

13. Sunglasses comprising the ophthalmic article of claim 1.

14. The ophthalmic article of claim 1, wherein a value of luminous transmittance Tv according to ISO standard 13666 is greater than or equal to 11% and less than or equal to 16% in the activated state of the photochromic dyes.

15. The ophthalmic article of claim 1, wherein the contrast-enhancing dyes are narrow-band dyes with a full width at half maximum (FWHM) greater than or equal to 10 nanometers (nm) and less than or equal to 30 nm.

16. The ophthalmic article of claim 1, wherein the contrast-enhancing dyes present one transmission minimum at wavelengths greater than or equal to 485 nanometers (nm) and less than or equal to 495 nm.

17. The ophthalmic article of claim 1, wherein the contrast-enhancing dyes present one transmission minimum at wavelengths greater than or equal to 580 nanometers (nm) and less than or equal to 590 nm.

18. The ophthalmic article of claim 1, wherein the ophthalmic article has a transmission at 400 nanometers (nm) that is less than or equal to 5%.

19. The ophthalmic article of claim 1, where the ophthalmic article exhibits a difference of at least 50% of a value of luminous transmittance Tv according to ISO standard 12312 between the deactivated state of the photochromic dyes and the activated state of the photochromic dyes.

20. An ophthalmic article, comprising:

a polymer substrate;

wherein the polymer substrate comprises at least one area with a blend of contrast-enhancing dyes and photochromic dyes, and wherein the ophthalmic article presents, at least in the at least one area with the blend of contrast-enhancing dyes and photochromic dyes, a contrast level value of $K_{up} \geq 30$ in an activated state of the photochromic dyes, which is higher than the contrast level value in a deactivated state of the photochromic dyes;

wherein the contrast-enhancing dyes present one transmission minimum at wavelengths greater than or equal to 580 nanometers (nm) and less than or equal to 590 nm; and wherein the transmission spectrum presents a minimum at wavelengths greater than or equal to 580 nanometers (nm) and less than or equal to 590 nm, in the activated state of the photochromic dyes, that is less than 4%.

* * * * *